United States Patent [19]
Newswanger

[11] Patent Number: 5,191,449
[45] Date of Patent: Mar. 2, 1993

[54] ANIMATED HOLOGRAPHIC STEREOGRAM DISPLAY

[75] Inventor: Craig Newswanger, Ventura, Calif.

[73] Assignee: CFC Applied Holographics, Oxnard, Calif.

[21] Appl. No.: 829,272

[22] Filed: Feb. 3, 1992

[51] Int. Cl.⁵ .................... G03H 1/26; G02B 27/22
[52] U.S. Cl. ................................. 359/22; 352/62; 353/7; 359/23
[58] Field of Search ............... 359/22, 23, 464; 352/57, 62, 63, 86, 87; 353/7, 10

[56] References Cited

U.S. PATENT DOCUMENTS

| | | |
|---|---|---|
| 3,807,828 | 4/1974 | Johnson et al. |
| 3,820,895 | 6/1974 | Mihail et al. ............... 359/23 |
| 4,037,919 | 7/1977 | Takeda et al. |
| 4,116,526 | 9/1978 | Clay et al. ................. 359/23 |
| 4,130,337 | 12/1978 | Okoshi ..................... 359/23 |
| 4,206,965 | 6/1980 | McGrew |
| 4,339,168 | 7/1982 | Haines |
| 4,832,424 | 5/1989 | McGrew |
| 4,993,790 | 2/1991 | Vick ........................ 359/23 |

OTHER PUBLICATIONS

E. G. Nassimbene, "Panoramic Lensless Stereoscopic Viewing System", *IBM Technical Disclosure Bulletin*, vol. 8, No. 10, Mar. 1966, pp. 1397 to 1398.

*Primary Examiner*—Martin Lerner
*Attorney, Agent, or Firm*—Blakely, Sokoloff, Taylor & Zafman

[57] ABSTRACT

An animated holographic stereogram display and method of creating the same is disclosed. In accordance with the method, a user views a hologram from a fixed relative position, the hologram containing a plurality of stereographic image pairs. A plurality of light sources are appropriately spatially dispersed so that each light source will illuminate the hologram so as to make the one stereographic image pair associated with that light source and viewing position viewable by the user. By using stereographic image pairs which are related to each other and appropriate time sequencing of the light sources, animation of the image pairs may be achieved. Uses of the system include facial animation whereby facial image pairs associated with various phonemes may be sequenced in accordance with a speech signal so that a limited set of image pairs may animate the face for a substantially unlimited vocabulary.

2 Claims, 4 Drawing Sheets

ANIMATED HOLOGRAPHIC STEREOGRAM DISPLAY

BACKGROUND OF THE INVENTION.

1. Field of the invention

The present invention relates to the field of holography, and more specifically, to real time animated holographic stereograms.

2. Prior Art

Holograms and holographic stereograms are well known in the prior art. By way of example, one prior art system utilizes a plurality of overlaid and independent holograms any one of which may be illuminated by a light source associated therewith so as to be viewable by an observer. Thus by selecting a different light source an entirely different image may be presented to the viewer. In other systems, holographic stereograms present different holographic images to each eye of an observer. Such systems typically utilize a relatively large number of images to attempt to obtain a true three dimensional effect as the observer moves with respect to the hologram, and in general, are relatively complicated systems. The purpose of the present invention is to provide an animated holographic stereogram display which is relatively simple, which may present holographic stereograms in real time and which, in certain applications, may present continuous animation such as the animation of a face synchronized with a voice track.

BRIEF SUMMARY OF THE INVENTION

An animated holographic stereogram display and method of creating the same is disclosed. In accordance with the method, a user views a hologram from a fixed relative position, the hologram containing a plurality of stereographic image pairs. A plurality of light sources are appropriately spatially dispersed so that each light source will illuminate the hologram to make the one stereographic image pair associated with that light source and viewing position viewable by the user. By using stereographic image pairs which are related to each other and appropriate time sequencing of the light sources, animation of the image pairs may be achieved. Uses of the system include facial animation whereby facial image pairs associated with various phonemes may be sequenced in accordance with a speech signal so that a limited set of image pairs may animate the face for a substantially unlimited vocabulary.

DETAILED DESCRIPTION OF THE INVENTION

Figure 1:
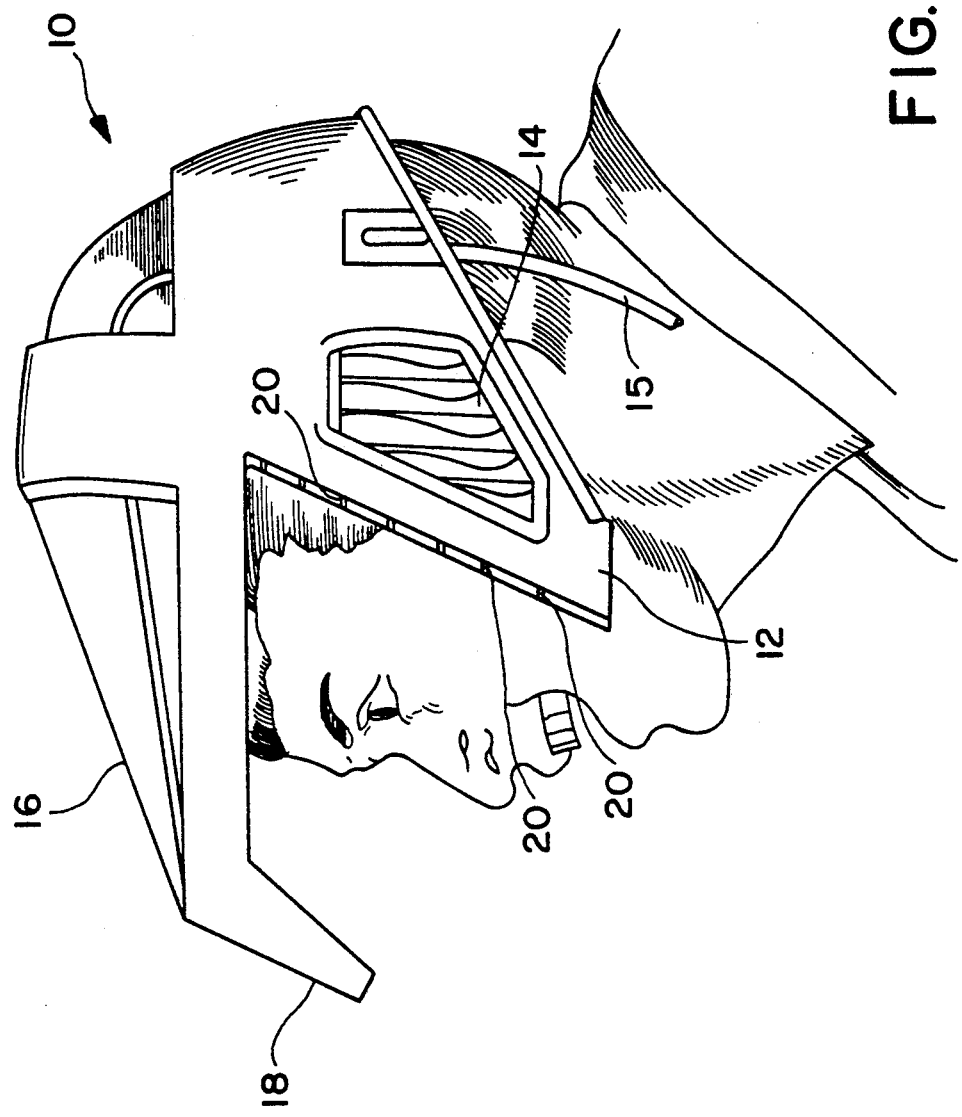
FIG. 1 is a side view of a person wearing helmet-like headgear incorporating the present invention.

First referring to FIG. 1, a side view of one embodiment of the present invention as worn by a user may be seen. This embodiment is in the form of a helmet-like device, generally indicated by the numeral 10. The helmet 10 has a pair of ear covering protrusions 12 extending downward at the sides thereof to cover the ears of the user, each having a speaker therein, generally indicated by the numeral 14, for providing monaural or stereo sound to the user. The projections 12 as well as the main body portion of the helmet 10 are of sufficient thickness to enclose the speakers and to enclose some electronics, and typically a battery power supply for providing power thereto. In many applications the helmet will include a cable 15 for connection to a tape player on a playset to provide audio and control signals thereto from the playset.

The top of the helmet 10 has a forward extending visorlike projection 16 supporting in a position forward of the user a downward projecting member 18, preferably positioned so as to be readily viewable by the user glancing upward, though unobstructing the user's view when the user is looking forward or downward. Finally, also viewable in FIG. 1 is a row of lights, in the preferred embodiment light emitting diodes 20, along the forward edge of one of the downward protruding ear covering members 12. As shall be subsequently seen, these light emitting diodes controllably direct light toward the inner portion of member 18 to illuminate a reflection mode hologram thereon.

Figure 2:
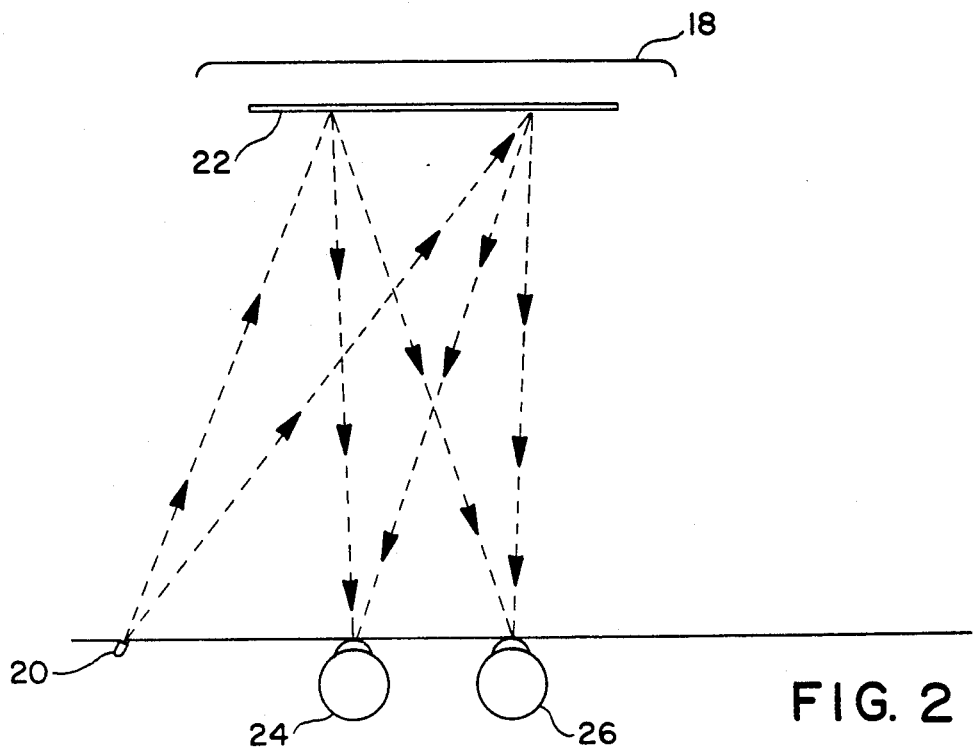
FIG. 2 is a schematic illustration of the relative orientation of the hologram in conjunction with the illuminating LEDs and the observer's eyes in the system of FIG. 1.
Figure 3:
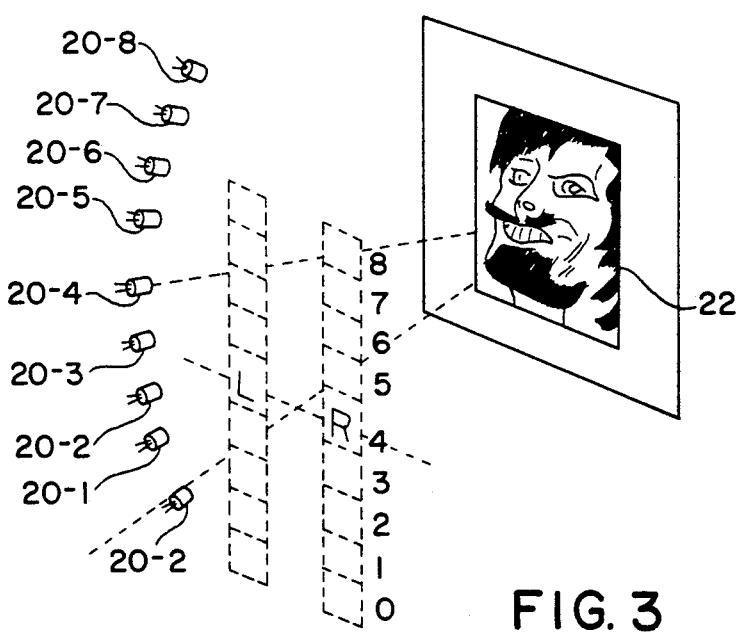
FIG. 3 is a perspective illustration of the hologram, the plurality of illuminating light emitting diodes and the resultant viewing zones for the illumination of the hologram by a central light emitting diode.

The embodiment shown in FIG. 1 is shown schematically in FIGS. 2 and 3. FIG. 2 illustrates the general physical orientation of an LED 20, a hologram 22 under the downward projecting member 18, and the observer's left and right eyes 24 and 26. The hologram 22, the construction of which shall be subsequently described, has a plurality of overlaid stereographic image pairs, each image of a pair having viewing zones horizontally displaced from each other, so that one image is viewed with the left eye and the other image of the image pair is viewed with the right eye. Each image pair further has a predetermined limited vertical viewing range adequate to allow reasonable variations in eye positions relative to the helmet, though sufficiently limited so that the viewing ranges of other pairs of holographic images may be individually stacked thereabove and/or therebelow.

The foregoing is illustrated in FIG. 3. There the holographic plate 22 is shown illuminated by one of the light emitting diodes 20, specifically light emitting diode 20-4 of the nine light emitting diodes numbered 20-0 through 20-8. This illuminates the hologram 22 so that the images of one image pair are viewable by the left and right eyes, respectively, of the observer located at the fourth viewing zone level. At the same time, the other eight image pairs are also theoretically "viewable", though each one through a unique one of the other eight viewing zone levels 0 through 3 and 5 through 8 below and above the eyes of observer, respectively, so as to not normally be visually perceivable by an observer wearing the helmet. If the source of light illuminating hologram 22 is raised, then the viewing zone of each image pair is lowered. Conversely, if the source of light illuminating the hologram 22 is lowered, then the viewing zone of each image pair is raised. Thus, if for instance, light emitting diode 20-4 is turned off and light emitting diode 20-5 is turned on, the viewing zone for the image pair previously viewed by the observer will move down to viewing zone level 3, with the image pair previously viewable in viewing zone level 5 now being viewable in viewing zone 4, the viewing zone level of the observer's eyes. Thus by control of the light emitting diodes, viewing zones for the nine image pairs 0 through 8 in the example of FIG. 3 may be moved upward and downward as desired, so that the control of the light emitting diodes will control which of the nine image pairs are viewable by the observer.

Since each image pair is a stereographic pair, a moving stereographic image ma be created by appropriate sequencing of the LEDs. In that regard, in a game application, by way of example, a character may appear at various points in the game as illustrated in FIG. 3, and be viewable by the person wearing the helmet by merely glancing upward from the game. The various images may show various mouth positions in sequence in conjunction with a voice signal presented to the speakers in the helmet so that the mouth of the image is synchronized to the voice, thereby appearing to be speaking directly to the player. Obviously, while the example shown in FIGS. 1 and 3 for exemplary purposes illustrate nine light emitting diodes, additional diodes and/or two or more horizontally spaced apart columns of diodes may be used, provided care is taken that any one image of any image pair is uniquely viewable over the viewing zone adequate in size and position to accommodate a reasonable range in eye position, given the differences in eye spacing and position between individuals that may be using the device such as adults, children, etc.

Figure 4:
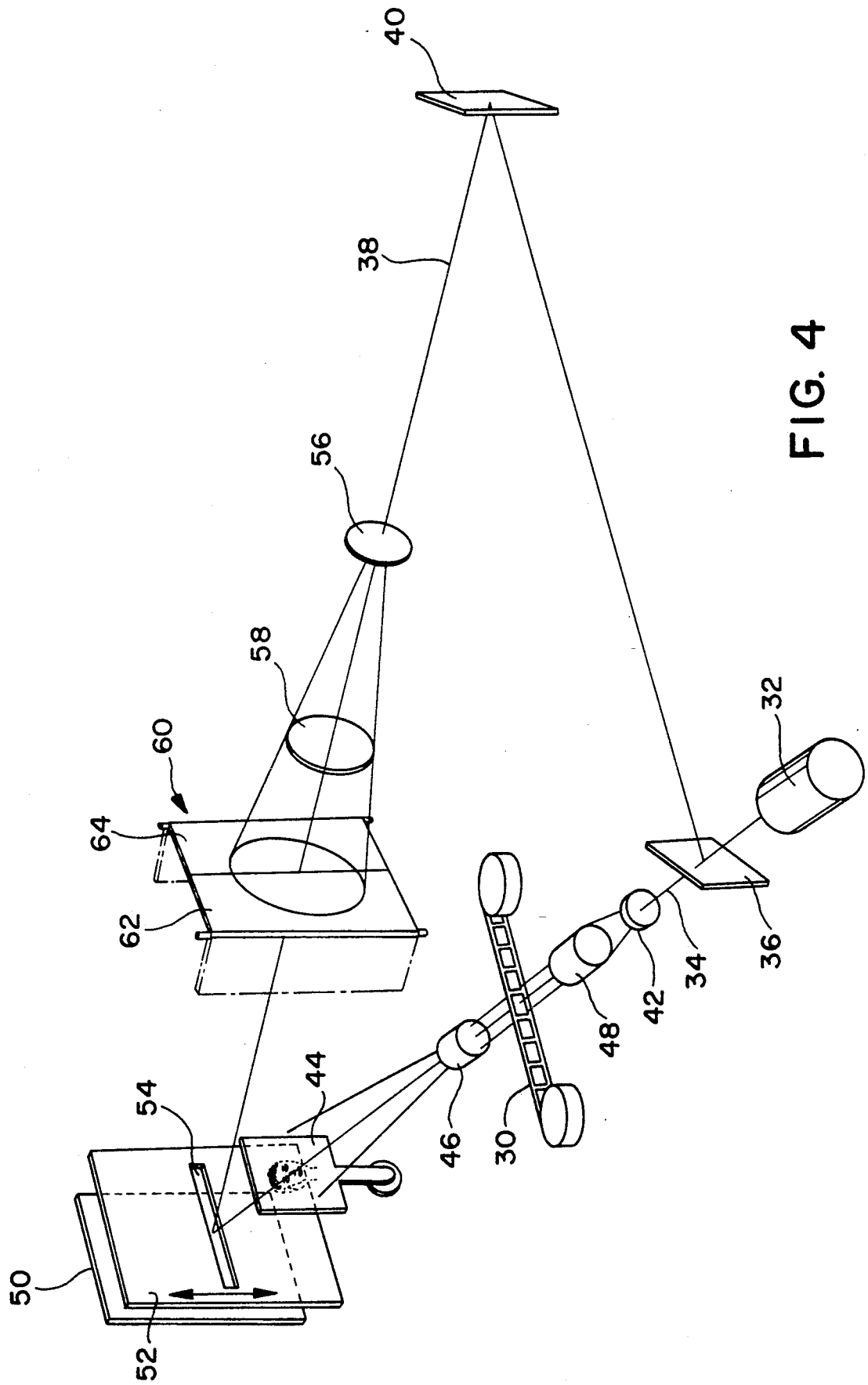
FIG. 4 is a schematic diagram illustrating the setup for forming the H1 hologram.

Now referring to FIG. 4, the basic setup for creating the H1 hologram may be seen. The first step in the method is to prepare the desired stereographic still shots of the desired subject using ordinary photographic processes, typically on a 35 mm film strip 30. While the order of the images on the film strip is not important, it is convenient to order them in a logical predetermined manner so that the exposure of the H1 hologram film may proceed in a corresponding logical manner. By way of example, it is convenient to order the images on the film strip in successive left and right image pairs for exposure of the H1 in the same sequence. For exposure purposes, a source of monochromatic light, such as laser 32, provides an object beam 34, and a reference beam 38 representing a part of the output of light source 32 as split off by beam splitter 36 and reflected in the appropriate direction by beam splitter 40. The object beam 34 is spread by a spatial filter 42 and is used to successively project each of the images on film strip 30 onto a frosted screen 44 through lenses 46 and 48. In an exemplary setup, the screen 44 is approximately 8¼ inches directly in front of the holographic film 50 to be exposed, the holographic film being in a fixed position behind a mask 52 having a movable slit 54 therein defining a horizontal region of the film 50 extending approximately ½" high and extending all the way across the same. In that regard, a convenient size to the film 50 is 8" wide x 10" high.

The portion of the beam which is split off to form the reference beam 38 is spread by a spatial filter 56, collimated by a collimating lens 58 and directed onto the mask 52 and through the slit 54 therein from the side at an angle of approximately 45 degrees. Positioned between mask 52 and the collimating lens 58 is a shutter assembly, generally indicated by the numeral 60, having left and right shutters 62 and 64, respectively. These shutters blank the left and right sides, respectively, of the film 50 which is exposed through slot 54 in mask 52. Thus when exposing the left side of film 50, the corresponding image on the 35 mm film strip 30 is projected onto the strip of film exposed through slot 54 of mask 52. At the same time, with shutter 64 closed and shutter 62 opened, the left half of the film exposed through slot 54 is illuminated with the reference beam, whereby on later development, the left half of the area of the negative exposed through the slit will form a hologram. Also at the same time, the right hand half of the area of the film exposed to the slit 54 is exposed only to the diffused light passing through the frosted screen 44. Thereafter this process is repeated by advancing the film strip 30 to the right hand image of the respective image pair, closing shutter 62, opening shutter 64, and again exposing the film, this time to record the hologram corresponding to the right image of the image pair on the right hand half of the exposed strip of film. In this second step, the left hand half of the exposed film is exposed only to light passing through the frosted screen 44 and accordingly, such exposure will not form a hologram on the development of the film. The effect of the exposure of the film strip to the object beam without the reference beam is to record some background noise for the hologram which will be formed thereon through an earlier or later exposure, though the noise is relatively low and does not significantly detract from the results obtained. If desired, the left and right shutter 62 and 64 could be positioned immediately over the mask 52 to eliminate this unnecessary exposure and resulting noise.

After the exposure of one left and right image pair, the movable slit 54 in mask 52 is raised ½", (typically by raising the entire mask, purposely made considerably taller than the film 50 therebehind) and the next image pair is each successively exposed onto the film uncovered by the slit. By repeating this process, the hologram film is fully exposed as desired, and may then be developed, the overall hologram consisting of left and right holograms, each approximately ½" high and comprising the left and right images respectively of an image pair, with the images of successive image pairs being stacked thereabove and below to form the desired stack of left and right images. It is important to note that the resulting hologram is not the same as would be obtained by leaving the mask 52 stationary and moving the film 50 up and down for successive exposure. In particular, by moving the mask vertically between exposures of each image pair, the resulting holograms are holograms of the respective image on the frosted screen 44 taken from a different vertical perspective (the left and right image hologram of an image pair having different horizontal perspective). These different vertical perspectives are very important to the formation of the H2 hologram, and would not be achieved if the film rather than the mask was moved between exposures of each image pair.

Figure 5:
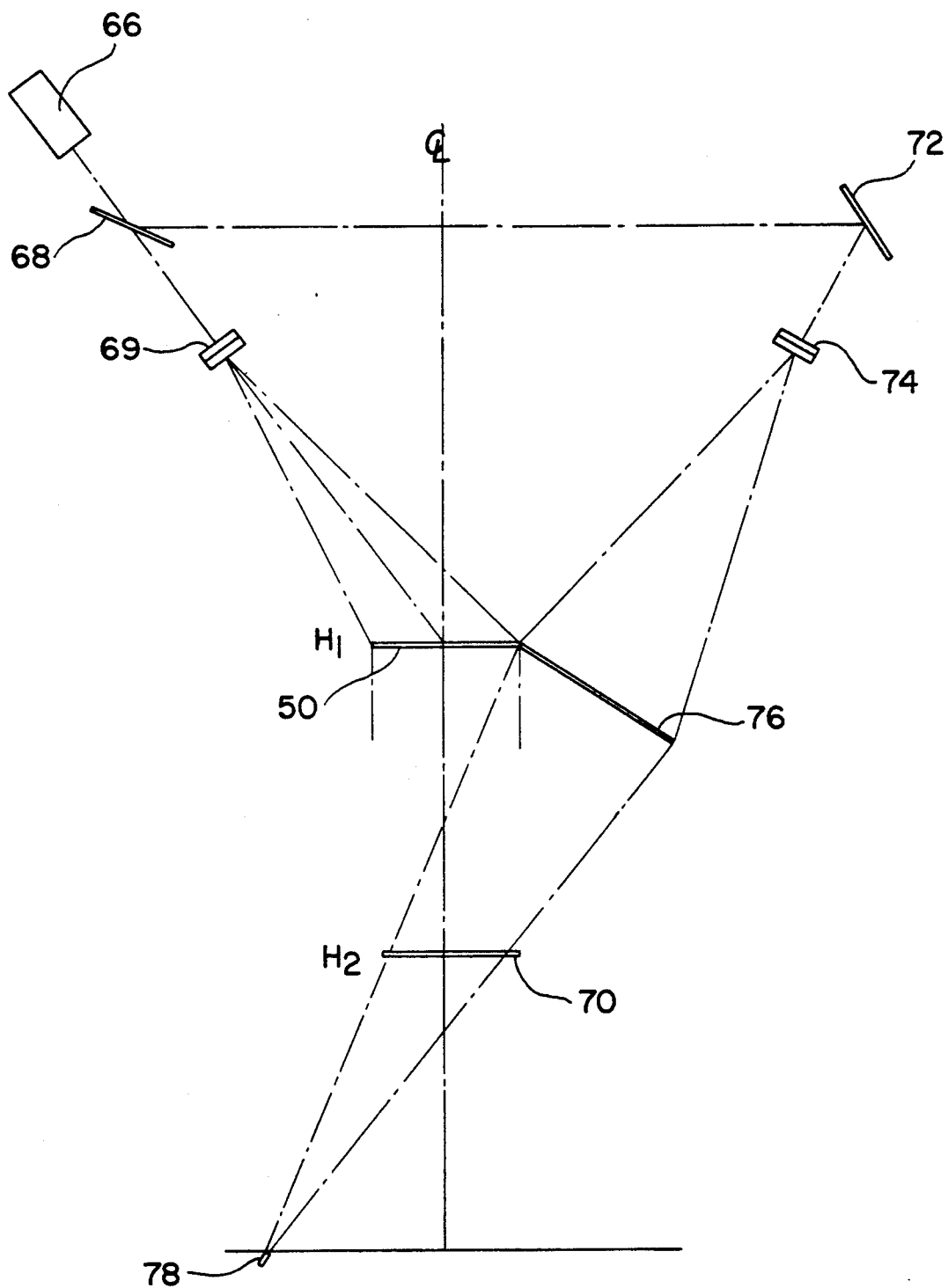
FIG. 5 is a schematic diagram illustrating the setup for forming the H2 hologram from the H1 hologram previously formed.

Once the H1 film 50 is exposed and developed, the resulting H1 hologram 50 is put into the setup shown in FIG. 5. As shown, a monochromatic light source 66 is positioned to illuminate the H1 50 through a beam splitter 68 and spatial filter 69 at an angle from the side of the holographic images corresponding to the angle of the reference beam used in forming H1 in FIG. 4, typically approximately 45 degrees. This causes all of the left and right images of all of the image pairs on the H1 50 to reconstruct at what was the position of the frosted screen 44 in FIG. 4, namely on the H2 film plate 70, all of the images being directly overlaid thereon. At the same time a portion of the beam is split off by beam splitter 68, reflected by mirror 72 and expanded by spatial filter 74 to be focused by lens 76 toward a point 78, 8¼ inches beyond the H2 film plate 70 corresponding to the ultimate relative position with respect to H2 of a center LED of the illumination system (see FIGS. 1 and 3). Thus by exposure of the film plate 70 in the setup shown in FIG. 5 and development of the film, the H2 hologram is formed. This hologram, as stated before, consists of all of the left and right images of all image pairs. Copies of the hologram 70 are then formed in a conventional manner such as, by way of example, by embossing techniques to form the hologram 22 of FIGS. 2 and 3. Because each image pair on the H1 was exposed from a different vertical prospective, as hereinbefore explained, all will reconstruct upon illumination by a single light emitting diode, though will do so with different vertical viewing zones for each image pair. Accordingly, each image pair is viewable as hereinbefore explained with respect to FIG. 3 by merely selecting for illumination the light emitting diode at the appropriate vertical level to bring the viewing zone of the respective image pair to eye level.

There has been disclosed and described herein a new and unique animated holographic stereogram display suitable for application in toys and the like. Since the display is controlled by the control of a plurality of light sources and thus is electrically controlled, the display may be readily synchronized with other phenomenon or occurrences such as, by way of example, being synchronized to a sound track such as a monaural or stereo sound track to cause the presentation of the stereogram, such as stereograms of a facial likeness, in synchronization with the voice itself. Also, while the number of image pairs which may be stacked vertically will be limited in any application, one or more additional groups of image pairs may be similarly stacked with a different side angular perspective and with additional sidewise spaced light sources to selectively cause each such image pair to fall within the viewing zone of the observer. In the system disclosed herein, it is preferable to use the first order refraction images for viewing, so that care should be taken in the geometry of the helmet to avoid any direct reflection or higher order refractive images to fall within the same viewing zones. Similarly, if a second column of LEDs is used to present additional stereographic images to the user, care must similarly be taken to be sure that only the desired first order images of either groups of image pairs fall within the viewing zone. Also, first and second image pairs selected from two groups of image pairs and reconstructed using two different color light sources will allow the presentation of color images to the user of the animated holographic stereogram display. Finally, while a reflection mode stereogram has been used herein, the principles of the invention are equally applicable to transmission mode holograms also. Thus while a preferred embodiment of the present invention has been disclosed and described herein, it will be understood by those skilled in the art that various changes in form and detail may be made therein without departing from the spirit and scope thereof.

I claim:
1. A holographic stereogram display comprising:
   a holographic unit comprising a plurality of first and second holographic images, each pair of first and second holographic images forming a stereographic image pair, said plurality of first images being overlaid on a first holographic element and said plurality of second images being overlaid on a second holographic element, said first and second elements being spaced apart to form said holographic unit so that said first holographic element will be viewable by one eye of an observer and said second holographic element will be simultaneously viewable by the second eye of the same observer, each image pair having predetermined side-by-side viewing zones when illuminated from a point source located in a predetermined relationship to said holographic unit, the viewing zone of each image pair being spatially separated from the viewing zones of each other image pair, and
   a plurality of light sources, each spatially disposed with respect to said holographic unit in a predetermined manner so that turning on any one light source will cause the viewing zones of the respective one image pair to be viewable by an observer.
2. The holographic stereogram display of claim 1 wherein the plurality of image pairs are of related subject matter, whereby displaying said image pairs in a sequence controlled by the control of said light sources will create an animated holographic stereogram display.

* * * * *